United States Patent [19]

Oliver et al.

[11] 3,900,401

[45] Aug. 19, 1975

[54] DUAL FILTER FOR LUBRICATING OIL

[75] Inventors: Haven D. Oliver, South Portland, Maine; Richard K. Burke, Groton, Conn.; Herbert Dobson, Jr., Bradford, R.I.; Leon E. Grant, Colchester, Conn.

[73] Assignee: The United States of America as represented by the Secretary of the Navy, Washington, D.C.

[22] Filed: Nov. 4, 1974

[21] Appl. No.: 520,327

[52] U.S. Cl. ................. 210/238; 210/341; 210/436
[51] Int. Cl.² ......................................... B01D 27/08
[58] Field of Search ............ 210/232, 340, 341, 452, 210/436; 137/625.41, 625.32, 625.19

[56] References Cited
UNITED STATES PATENTS

| | | | |
|---|---|---|---|
| 1,042,203 | 10/1912 | Dahl | 210/340 |
| 1,068,743 | 7/1913 | Dahl | 210/341 |
| 1,634,086 | 6/1927 | Scoville | 210/340 X |
| 1,774,758 | 9/1930 | Morse et al. | 210/340 X |
| 2,712,871 | 7/1955 | Schmid | 210/452 UX |
| 3,203,448 | 8/1965 | Jansen | 137/625.41 |
| 3,394,735 | 7/1968 | Wurster | 210/341 X |
| 3,472,279 | 10/1969 | Sanderson | 137/625.41 |
| 3,768,654 | 10/1973 | Pearce | 210/452 X |

*Primary Examiner*—Theodore A. Granger
*Attorney, Agent, or Firm*—R. S. Sciascia; Paul S. Collignon

[57] ABSTRACT

A dual lubricating oil filter having a double-ball valve for selectively directing the flow of oil through one of a pair of filter elements. Each filter is housed in a section having a cover which cannot be removed during pressurization. Rotation of the double-ball valve automatically depressurizes one of the sections thereby permitting a cover to be removed and the removal of a cover prevents any further rotation of the valve thereby preventing oil flow from being shifted to a section that has an opened cover.

3 Claims, 6 Drawing Figures

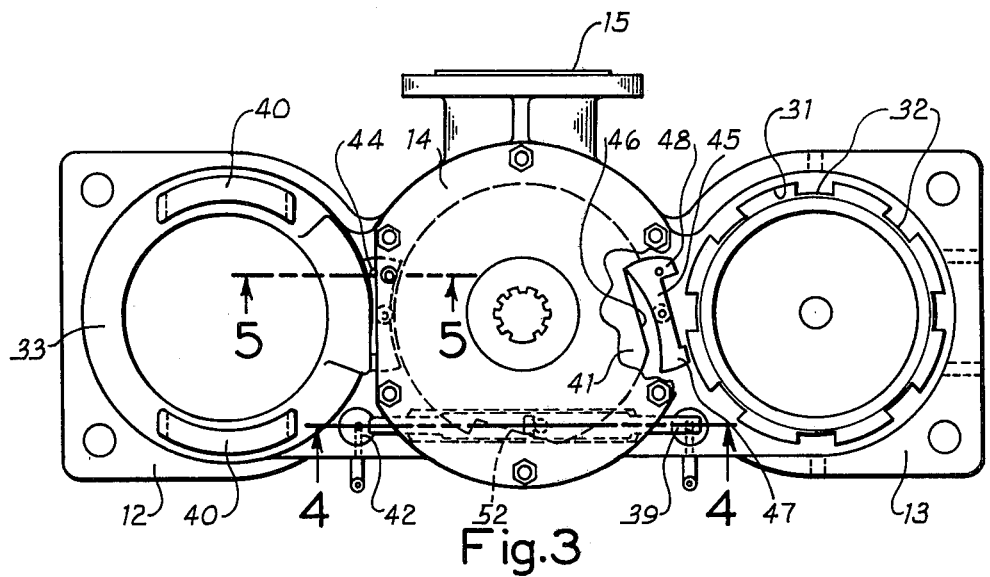
Fig.3
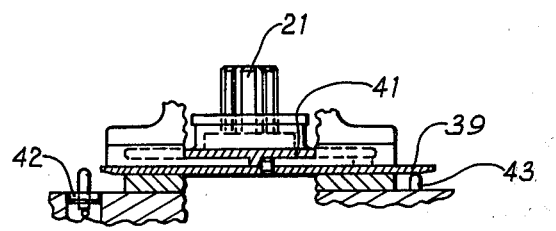
Fig.4
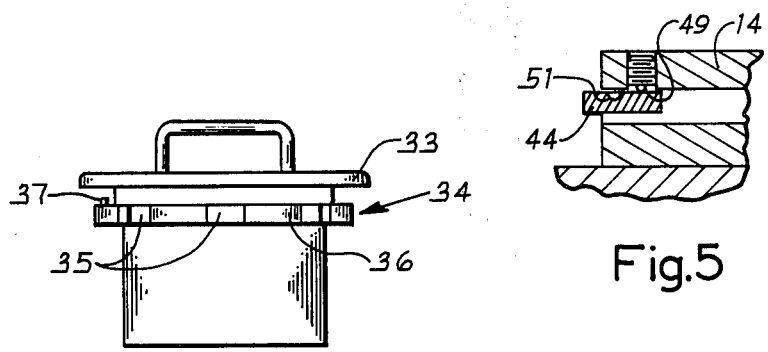
Fig.5
Fig.6

DUAL FILTER FOR LUBRICATING OIL

BACKGROUND OF THE INVENTION

The present invention relates to an oil filter for an engine and more particularly to a dual oil filtering system for naval shipboard use.

Lubricating oil strainers presently being used by the Navy in shipboard installations do not provide a desired degree of reliability and safety. In many installations, the strainer is a source of constant leakage and requires frequent seal maintenance. Also the present designs permit improper operation with a minimum of operator carelessness, which can result in the spraying of hot oil on personnel and adjacent equipment. This can cause personal injury to the operator and, because the oil is flammable, a definite fire hazard exists when the oil is sprayed or spilled.

Although dual filter systems have been operated in the past, these systems have not been designed for shipboard use and do not have the required safety features for preventing injury to operators and for preventing spills that can cause fires. One such dual filtering system is shown and described in U.S. Pat. No. 3,291,562, which issued Dec. 13, 1966, to D. L. Anderson. In this patented device, extended filter life is achieved by the selective use of a pair of filters. A main filter is constantly open for the circulation of solvent from a storage reservoir through the main filter while the second or reserve filter is opened to such flow only during the filling portions of the cycle. Thus, the main filter performs the major portion of the filtering operation while the reserve filter is cut into the line during filling portions of the cycle, and after the solvent has already been subjected to a filtering operation by the main filter.

SUMMARY OF THE INVENTION

The present invention has a housing having two sections for containing filter elements. Two angle-ported ball valves are attached to common stem and shift of oil flow from one section to the other is accomplished by 90° rotation of the two ball valves. The cover on each section is designed so it cannot be removed until the section is depressurized and fluid flow fully shifted to the other filter. Depressurization is accomplished automatically when the ball valves shift the flow from one filter to the other. When a cover is removed from the housing, an automatic locking device prevents rotation of the ball valves thereby preventing the flow of oil to a section that has an opened cover.

It is therefore a general object of the present invention to provide a dual filtering system for shipboard use having safety features for preventing accidental spillage of oil.

Other objects, advantages and novel features of the invention will become apparent from the following detailed description of the invention when considered in conjunction with the accompanying drawings.

BRIEF DESCRIPTION OF THE DRAWINGS

FIG. 3 is a sectional view, partially broken away, taken on line 3—3 of FIG. 1;

FIG. 4 is a sectional view taken on line 4—4 of FIG. 3;

FIG. 5 is a sectional view taken on line 5—5 of FIG. 3; and

FIG. 6 is a side view of a cover.

DESCRIPTION OF THE PREFERRED EMBODIMENT

Figure 1:
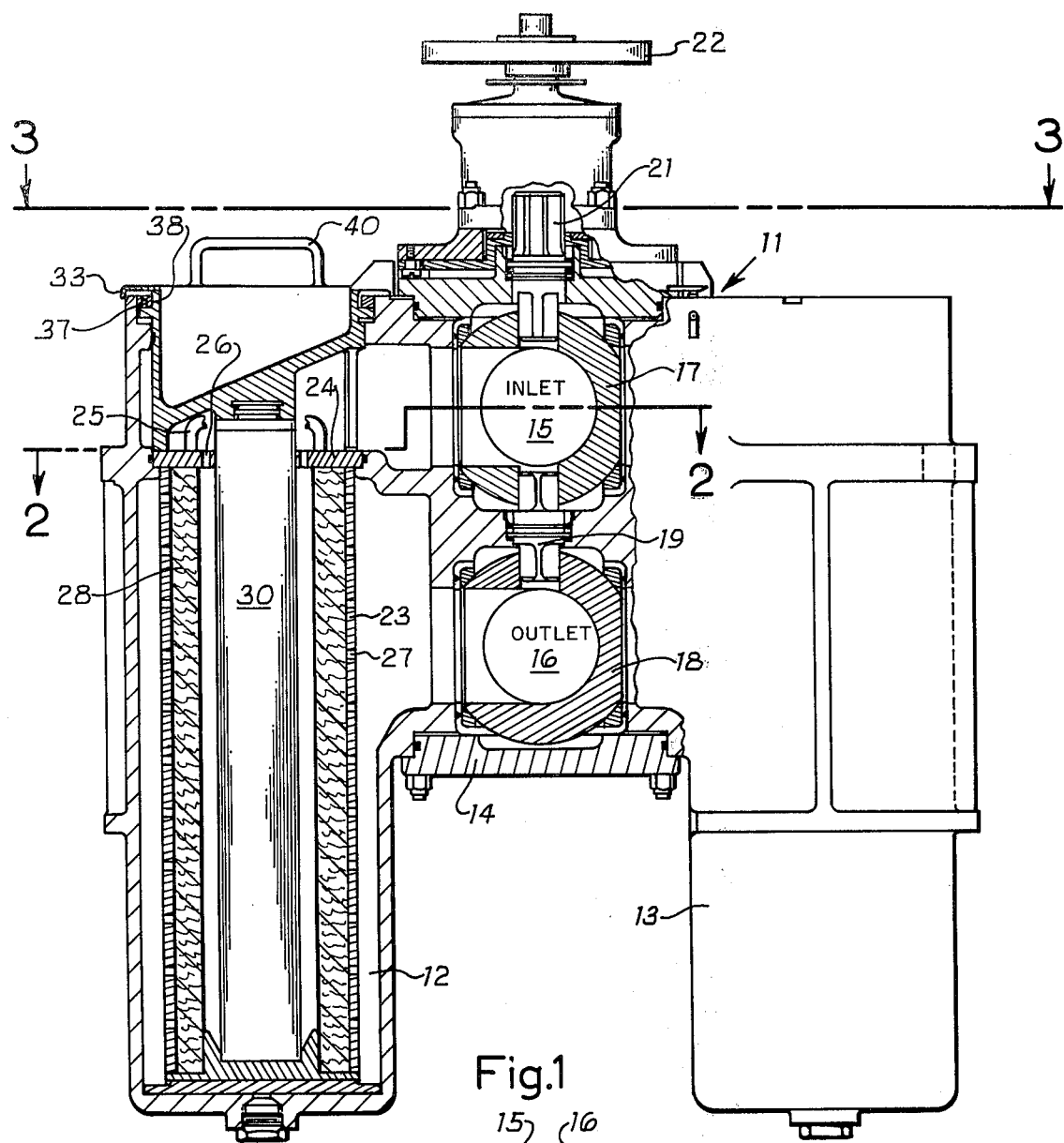
FIG. 1 is a side view, partly in section, of a preferred embodiment.
Figure 2:
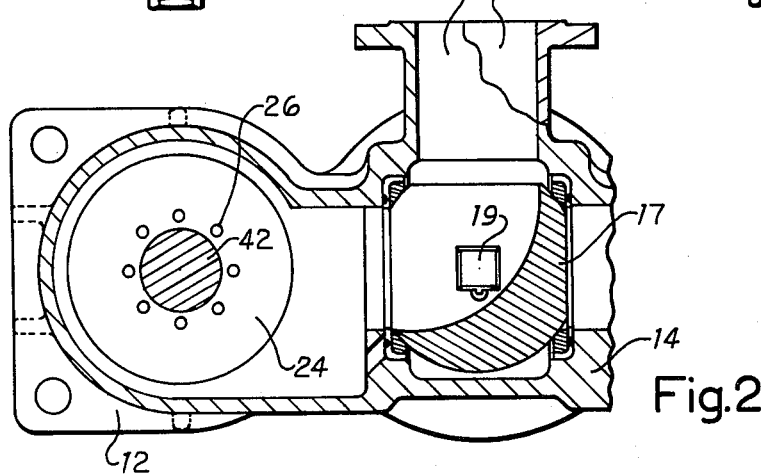
FIG. 2 is a partial sectional view taken on line 2—2 of FIG. 1.

Referring now to the drawings, there is shown an oil filter housing 11 having two filter sections 12 and 13 positioned on each side of a flow-control section 14. Flow control section 14 is provided with an inlet 15, and an outlet 16, below the inlet. Ball valves 17 and 18 are rotatably positioned in inlet 15 and outlet 16, respectively, and ball valves 17 and 18 are connected by a stem 19. A splined shaft 21 engages ball valve 17, and splined shaft 21 is connected by a suitable gearing arrangement to handwheel 22. As shown in FIGS. 1 and 2, valves 17 and 18 are positioned so that flow would be through inlet 15 and valve 17 into filter section 12, and then out through valve 18 and outlet 16. Flow can be shifted from section 12 to section 13 by rotating ball valves 17 and 18 90 degrees.

Filter sections 12 and 13 each contain a basket 23 having a lid 24 attached thereto, and handles 25 are attached to lid 24 to facilitate removal of the basket from the filter section. As best shown in FIG. 1 of the drawings, lid 24 is provided with holes 26 and basket 23 is provided with a plurality of holes 27 for permitting oil to flow therethrough. A filter element 28 is placed inside basket 23 and filters oil passing into basket 23.

As best shown in FIG. 3 of the drawings, the top surfaces of sections 12 and 13 are provided with a plurality of slots 31 that form a plurality of lugs 32. In FIG. 3 of the drawings, eight slots are shown, thereby providing eight lugs 32. A cover 33 is provided with a flange 34 that also has a plurality of slots 35 equal in number to slots 31 thereby providing a plurality of lugs 36 on flange 34. The diameter of flange 34 is slightly less than an inside diameter taken across slots 31 so that lugs 36 on cover 33 will pass through slots 31 when so aligned and then, upon rotation of cover 33, lugs 36 will align beneath lugs 32 thereby providing a locking arrangement for cover 33. Upon pressurization of either section 12 or 13, pressure will slightly raise cover 33 so that pin 37 will engage a slot or hole in flange 38 thereby preventing any rotation of cover 33. As cover 33 must be rotated so that lugs 36 align with slots 31, it can readily be seen that as long as either section 12 or 13 is pressurized, cover 33 cannot be removed and thus accidental or inadvertent opening of a pressurized section is prevented. Each cover 33 is provided with a pair of handles 40 to facilitate turning and lifting and a volume plug 30 is attached to each cover 33 so that the oil level will fall below the top of filter basket 23 when cover 33 is removed.

Referring particularly to FIGS. 3 and 4 of the drawings, when fluid flow is shifted from one section to another, a slide bar 39 is provided to operate vent valve 42 in section 12 and vent valve 43 in section 13. Slide bar 37 is cammed to a timing disk 41 which is rotated with handwheel 22. Camming of slide bar 39 is arranged so that the vent on the section being used does not shut until ball valves 17 and 18 turn the last few degrees thereby permitting any air in the section to have ample time to escape.

A pair of locking pawls 44 and 45 are pivotally attached to section 14 and prevent rotation of valves 17 and 18 when one cover 33 is removed. As shown in FIG. 3 of the drawings, pawl 45 is engaged with a notch 46 in timing disk 41 and prevents rotation of timing disk 41 and also valves 17 and 18 which are rotatable with timing disk 41. Each pawl is provided with a pair of ears 47 and 48 which are engageable with a lug 36 on cover 33. The unlocking of cover 33, by rotation, causes a lug 36 to engage with ear 48 and pivots the pawl to engage with notch 46 in timing disk 41. As shown in FIG. 5 of the drawings, a spring-load detent pin 49 is provided in section 14 and is engageable with a detent notch 51 in the pawl to retain the pawl in contact with notch 46 when cover 33 is removed.

OPERATION

The operation of the present invention will be described in relation to the embodiment shown in the drawings, that is, with section 12 being pressurized and with section 13 having its cover 33, filter basket 23 and filter element 28 removed. As shown in FIGS. 3 and 4 of the drawing, slide bar 39 is depressing vent valve 43, while vent valve 42 remains closed and section 12 is pressurized. Since section 12 is pressurized, cover 33 is slightly raised and pin 37 is engaged in a slot in flange 38 thereby preventing any rotation of cover 33. Since cover 33 cannot be rotated, it cannot be removed and thus any accidental opening and spilling of oil is prevented. Oil flows into inlet 15 and through valve 17 into filter sections 12 and, after filtering by filter element 28, passes through valve 18 into outlet 16.

As shown in FIG. 3 of the drawings, locking pawl 45 is engaged with notch 46 in timing disk 41 and pawl 45 prevents rotation of valves 17 and 18 thereby preventing any shifting of the flow of oil to section 13. Upon placing a basket 23 and filter 28 in section 13, cover 33 is placed in position by aligning lugs 36 on cover 33 with slots 31 in section 13. Upon turning cover 33 to a locked position, a lug 36 engages ear 47 on locking pawl 45 and pivots pawl 45 clear of notch 46. Handwheel 22 is now free to turn and, upon turning of handwheel 22, timing disk 41, valve 17 and valve 18 are rotated thereby shifting flow of oil from section 12 to section 13. When fluid flow is shifted from one section to another, slide bar 39 which is cammed to timing disk 41, slides back and forth to operate vent valves 42 and 43. The camming is arranged so that the vent on the section to be used does not shut until ball valves 17 and 18 turn the last few degrees thereby permitting any air in the section to have ample time to vent. Thus, when flow of oil is shifted from section 12 to section 13, the sliding of slide bar 39 opens vent valve 42 and closes vent valve 43. Upon pressurization of section 13, cover 33 raises and pin 37 engages a slot in flange 38 of section 13, thereby preventing any rotation of cover 33 on section 13. Upon opening of vent valve 42, section 12 is depressurized and cover 33 on section 12 can now be depressed so that pin 37 clears flange 38 whereupon cover 33 can be rotated and removed. A second notch 52 on timing disc 41 has moved into position to be engaged by locking pawl 44 and, rotation of cover 33 on section 12 causes pawl 44 to pivot and engage notch 52 thereby preventing any turning of handwheel 22 and, consequently, preventing rotation of valves 17 and 18.

It can thus be seen that the present invention provides a dual filtering device wherein lubricating oil can be selectively passed through one of two filters and safety features are present which prevents flow to a filter that has an opened cover.

Obviously many modifications and variations of the present invention are possible in the light of the above teachings. It is therefore to be understood that within the scope of the appended claims the invention may be practiced otherwise than as specifically described.

We claim:

1. A dual filtering device for lubricating oil comprising,
   a housing having first and second filtering sections separated by a flow control section, said first and second filtering sections each being closed at one end and having an opening at the other end with a plurality of housing lugs disposed about the periphery of each opening, said flow control section having an inlet and an outlet for lubricating oil,
   an aperture in one of said housing lugs,
   a shaft rotatably positioned in said flow control section,
   first and second filter elements positioned one each in said first and second filtering sections,
   a first valve positioned in said inlet and connected with said shaft and a second valve positioned in said outlet and connected with said shaft whereby flow of lubricating oil can be selectively passed through said first and second filter elements by rotating said shaft,
   first and second covers closing the openings, respectively, in said first and second filtering section, each said cover having a plurality of cover lugs engageable with said housing lugs to lock said covers with said housings when said covers are rotated and said cover lugs are positioned beneath said housing lugs,
   a pin in each said cover adaptable for engagement one each with one of said apertures in said housing lugs whereby pressure within each said filtering section lifts said cover associated therewith and said pin enters said aperture thereby preventing rotation of said cover,
   a timing disk attached to said shaft, and
   first and second pawls pivotally attached to said housing and engageable with said timing disk to prevent rotation of said shaft, said first pawl being engageable with said first cover for biasing said pawl out of engagement with said timing disk and said second pawl being engageable with said second cover for biasing said pawl out of engagement with said timing disk whereby said shaft can only be rotated to connect said inlet and outlet valves to a filtering section that has a cover thereon.

2. A dual filtering device as set forth in claim 1 having a first vent valve in said first filtering section and a second vent valve in said second filtering section, said first and second vent valves being normally biased in a closed position, and a bar slidably attached to said flow control section and actuable by said timing disc to selectively open said vent valves.

3. A dual filtering device as set forth in claim 1 wherein said first and second valves are ball valves pivotally mounted in said flow control section whereby lubricating oil can be selectively flowed through said first and second filtering sections by rotation of said shaft.

* * * * *